April 10, 1962     D. G. PITTWOOD     3,028,770
AUTOMATIC COUPLING AND UNCOUPLING APPARATUS FOR MACHINE TOOLS
Filed Dec. 30, 1958     4 Sheets-Sheet 1
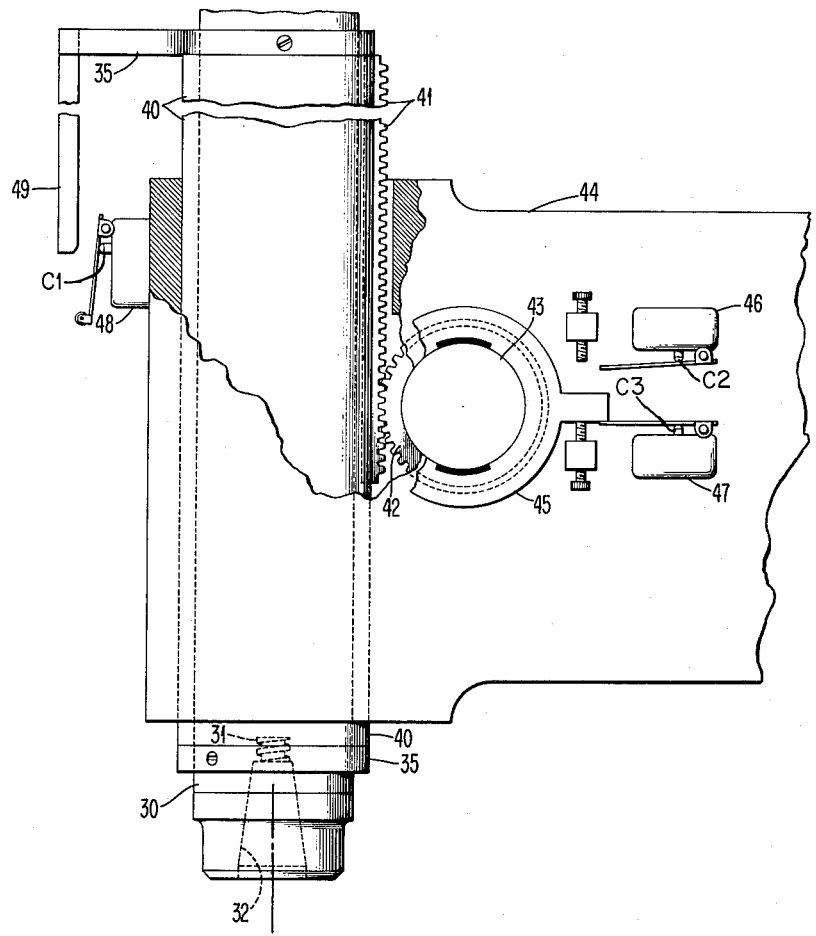
FIG. 1
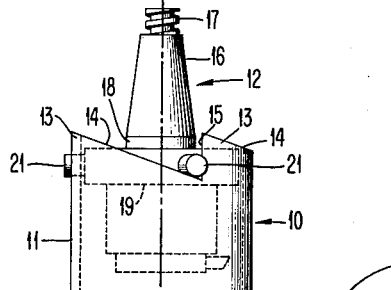
INVENTOR
DONALD G. PITTWOOD
BY Donald F. Voss
ATTORNEY April 10, 1962     D. G. PITTWOOD     3,028,770
AUTOMATIC COUPLING AND UNCOUPLING APPARATUS FOR MACHINE TOOLS
Filed Dec. 30, 1958     4 Sheets-Sheet 2

United States Patent Office 3,028,770
Patented Apr. 10, 1962

3,028,770
AUTOMATIC COUPLING AND UNCOUPLING APPARATUS FOR MACHINE TOOLS
Donald G. Pittwood, Rochester, Minn., assignor to International Business Machines Corporation, New York, N.Y., a corporation of New York
Filed Dec. 30, 1958, Ser. No. 783,942
8 Claims. (Cl. 77—4)

This invention relates to apparatus for providing automatic tool changing for boring and like machines and, more particularly, to apparatus for cradling machine tools which facilitates the automatic coupling and uncoupling of the machine tools with respect to the spindle of the machine adapted to utilize the tools.

The present invention is an improvement to provide automatic tool changing for machines equipped with a movable spindle for the tools and, preferably, but not essentially, with a numerical table positioning mechanism. The tools for the machine are normally contained in tool cradling apparatus which may be positioned remote of the machine, carried by the table of the machine, or carried by a fixture plate for holding the workpiece to the machine table. In any event, when a tool is to be initially inserted into the machine spindle or to be removed therefrom to permit another tool to be inserted in its place, the vertical axis of the apparatus for cradling the tool is aligned with the vertical axis of the machine spindle. After the tool cradling apparatus is aligned with the machine spindle in the instance of receiving a tool, the spindle, while rotating, is lowered by the feed mechanism to embrace the tool. The tool is fitted with elements adapted to cooperate with the apparatus for cradling the tool so that the tool couples with the rotating machine spindle. As the tool couples with the machine spindle, the tool cradling apparatus together with the elements embracing the tool function to force the spindle upward in opposition to the downward force of the feed mechanism. This upward movement of the machine spindle is caused to actuate mechanism for signaling the machine that the tool has been loaded or inserted into the machine spindle. Upon receiving a signal that the tool has been inserted into the spindle, the feed mechanism is operated to retract the spindle. The workpiece may then be brought into position with respect to the machine spindle which is lowered so that the tool therein may perform an operation.

After the particular tool in the machine spindle performs its operation or operations, it will be removed from the machine spindle and another tool will be inserted in its place. To remove a tool from the machine spindle, the vertical axis of the empty tool cradling apparatus is aligned with the vertical axis of the machine spindle. The machine spindle, while rotating, is then lowered by the feed mechanism to bring the tool into the tool cradling apparatus. The elements fitted to the tool engage the tool cradling apparatus and, by combined cooperative effort, the tool is caused to uncouple from the spindle. As the tool uncouples from the spindle, the same is forced upward in opposition to the downward force of the feed mechanism. This upward movement of the machine spindle actuates apparatus for signaling the machine that the tool has been uncoupled from the machine spindle. The feed mechanism is operable to retract the spindle in response to receiving a signal indicating that the tool has been uncoupled from the machine spindle. With the tool removed from the machine spindle and the machine spindle retracted, the tool cradling apparatus of another tool may be positioned in alignment with the machine spindle to enable the other tool to be inserted therein.

In this manner, tools may be automatically inserted into and removed from the machine spindle to enable the machine to perform continuous operations to complete the entire machining of a workpiece.

It is thus seen that cooperation of the tool with the apparatus for cradling the tool permits the automatic coupling and uncoupling of the machine tool from the machine spindle. Hence, by this arrangement, it is not necessary to provide wrench mechanisms in addition to the tool cradle to couple and uncouple the tools from the machine spindle. Further, the wrench mechanisms usually involved for this purpose consist of moving elements which are somewhat complex in nature and expensive to manufacture. The use of the tool cradle to facilitate the automatic coupling and uncoupling of the tools with respect to the machine spindle not only obviates the need for additional wrenching mechanisms, but the tool cradle does not itself contain relatively moving elements as found in wrenching mechanisms. Further, it is seen that, during the coupling and uncoupling of the machine tools, the spindle is caused to move upward in opposition to the downward force of the feed mechanism; and this movement of the machine spindle actuates mechanism for indicating to the machine when the coupling and uncoupling of the machine tool has been completed.

Accordingly, it is a prime object of the invention to provide an improved apparatus for automatic coupling and uncoupling of machine tools from a machine spindle.

A very important object of the present invention is to provide a device for automatically coupling and uncoupling machine tools with respect to a machine spindle which utilizes the tool cradle for facilitating the automatic coupling and uncoupling of the tools.

Another important object of the invention is to provide a device for automatically coupling and uncoupling machine tools with respect to a machine spindle which utilizes the translation of the machine spindle to determine when the coupling and uncoupling operation has been completed.

Another object of the invention is to provide a device for automatically coupling and uncoupling machine tools with respect to a machine spindle which is simple in construction and inexpensive to manufacture.

Still another object of this invention is to provide a device for automatically coupling and uncoupling machine tools with respect to a machine spindle which, in of itself, does not require relative moving parts.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 1 is a side elevational view showing the machine spindle in its normal retracted position, the switching mechanism in a corresponding position, and the tool in the tool cradle which is aligned with the machine spindle;

Figure 4:
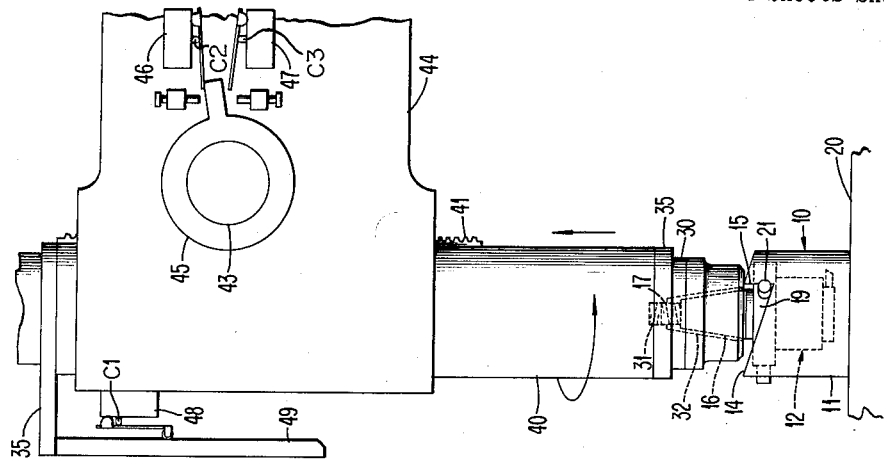
FIG. 4 is a side elevational view showing the spindle rotating in a counterclockwise or reverse direction with the tool seated in the tool cradle so that the studs are urged against the vertical surfaces of the teeth in the tool cradle, whereby the spindle is forced upward as it uncouples from the tool.

Referring to the drawings, the invention is illustrated by way of example in FIG. 1 with a tool cradle 10 fixed to a table 20 of a machine at a discrete coordinate position on the table 20. The table 20 of the machine may be of the type disclosed and described in the patent application of M. Morgan, Serial No. 705,701, filed December 27, 1957. While the tool cradle 10 is fixed to the table 20 at a discrete coordinate position, the table 20 itself is movable in coordinate directions relative to a machine spindle 30 which may be located at a fixed coordinate position. In this manner, it is possible to position the table 20 so as to bring the vertical axis of the tool cradle 10 in alignment with the vertical axis of the machine spindle 30. The referenced patent application describes a system for automatically positioning the machine table 20 to any selected coordinate position relative to the machine spindle 30. Since the machine table 20 is selectively positionable to any coordinate position relative to the machine spindle 30, the tool cradle 10 or cradles, depending upon the number of tools 12 involved, may be fixed directly to the machine table 20 at a predetermined coordinate position. In some instances, it may be desirable to mount the tool cradle 10 or cradles at discrete coordinate positions directly upon a fixture plate, not shown, for holding the workpiece. The fixture plate itself then would be mounted upon the machine table 20 at discrete coordinate positions. Hence, the fixture plate could contain as many tool cradles 10 as there are tools 12 to complete the entire machining of the workpiece to be machined. It also could be quite possible that the tool cradles 10 would be contained on a movable member, auxiliary to the machine table 20, which also would be positionable to discrete coordinate positions relative to the machine spindle so as to permit the simultaneous positioning of the workpiece and tool cradle in alignment with the machine spindle. In this manner, the tool in the tool cradle could be coupled with the machine spindle and be in readiness to perform an operation while the workpiece is coming into position to permit an operation to be performed. The principles of the invention are the same for any of the arrangements just mentioned.

The tool cradle 10 may consist of a cylindrical body member 11 which is hollow or tubular to receive and support tool 12. The cylindrical body member 11 is mounted in a vertical position with one end fixed to the machine table 20, fixture plate, or auxiliary table, whatever the case may be, and the other or free end projecting upwardly therefrom. The height of the cylindrical member 11 is not critical but must be sufficient to accommodate the tool 12 which it supports or cradles. The free end of the cylindrical member 11 is provided, in this example, with three equally spaced teeth 13. Each tooth 13 has an inclined portion 14 or surface and a vertical portion 15 or surface. The inclined portion 14 of one tooth 13 slopes downwardly to terminate at the base of the vertical portion 15 of an adjacent tooth 13. The degree of slope of the inclined portion 14, as will be seen shortly, while a matter of choice, can be quite critical. The height of the vertical portion 15, of course, is determined more or less by the slope of the inclined portion 14 and the diameter of the cylindrical member 11.

The tool 12 to be cradled or supported by the cylindrical member 11 is shown as any ordinary machine tool having a tapered shank portion 16 provided with a threaded portion 17 at the end of the shank 16. The threaded portion 17 of the tool 12 is adapted to threadedly engage internal threads 31 of the machine spindle 30 which also has a complementing tapered portion 32 adapted to embrace the tapered shank 16 of the tool 12.

The tool 12 has a central body portion 18 fitted with or embraced by a ring member 19. The ring member 19 is provided with three equally spaced radial outwardly projecting pins or studs 21. The ring 19 embracing the tool 12 is adapted to reside within the cylindrical member 11 of the tool cradle 10, and the length of the radially projecting studs 21 is such so as to extend across or span the wall of the cylindrical member 11. With the tool 12 in the tool cradle 10, the studs 21 project from the ring member 19 so as to engage the inclined portion 14 of one tooth 13 and the vertical portion 15 of an adjacent tooth 13. Therefore, the extent that the cutting portion of the tool 12 extends into the cylindrical body member 11 depends upon the location of the ring member 19 embracing the central body portion 18 of the tool 12.

The studs 21 projecting from the ring member 19 cooperate with the teeth 13 of the cylindrical body member 11 to enable coupling and uncoupling torques to develop between the machine spindle 30 and the shank 16 of the tool 12.

The slope of the inclined portions 14 of the teeth 13 determines the coupling torque developed. If the slope is shallow, a lesser torque is developed and a greater diameter cylindrical body member would be required than if the slope were steep. The inclined portions 14 of the teeth 13 function to retard rotation of the tool 12 as the rotating spindle 30 is brought over the shank 16 of the tool 12 to thread thereon. The tool 12 threads into the spindle 30 until there is sufficient torque developed to start the tool 12 rotating, whereby the studs 21 follow along the inclined portions 14 of the teeth 13 of the cylindrical body member 11. As the studs 21 travel up the slope of the inclined portions 14, the machine spindle 30 is forced upward in opposition to the force which feeds the spindle 30 downward onto the tool 12. The machine spindle 30 is fed in a vertical direction toward and away from the machine table 20 by means of an air cylinder, not shown, in a well-known manner.

The upward movement of the spindle 30, as the studs 21 travel up the slope of the inclined portions 14, is detected to signal the controls of the machine that the machine that the tool 12 has been coupled with the spindle 30. A slideable cylinder member 40 embracing the spindle 30 is adapted to be moved thereby in a vertical direction but not rotated by the spindle 30. The cylinder member 40 is journaled, in a well-known manner, on the spindle 30 to be carried thereby between two collar members 35 fixed to the spindle 30. Hence, as the spindle 30 is moved up and down, the cylinder member 40 will be moved along with it but will not be rotated as the spindle 30 rotates.

The cylinder member 40 is provided with a rack 41 which is adapted to mesh with a pinion gear 42 fixed to a shaft 43 journaled in a housing 44 through which the spindle 30 and cylinder member 40 also extend, as shown in FIG. 1. A portion of the shaft 43 extends beyond the housing 44 to carry an actuating arm 45 frictionally mounted thereon. The actuating arm is confined between and adapted to operate spaced contact switches 46 and 47. Hence, as the spindle 30 is moved up and down, the actuating arm 45 is rotated by the shaft 43 through the pinion 42 and rack 41 arrangement. As the arm 45 rotates, it actuates the switches 46 and 47. Since the spindle movement is relatively greater compared to the allowed movement of the actuating arm 45, the same is frictionally mounted on the shaft 43 to permit continued rotation of the shaft 43. In this manner, as the spindle 30 moves up or down, the actuating arm engages one of the switches 46 or 47, depending upon the direction of movement, and remains in engagement therewith until the spindle 30 is moved in the opposite direction.

Figure 2:
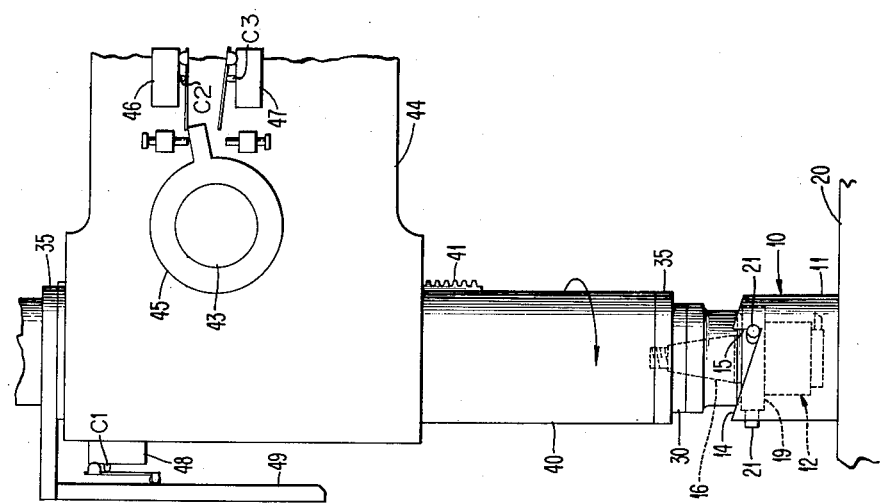
FIG. 2 is a side elevational view showing the spindle while rotating in a clockwise or forward direction having just embraced the tool in the tool holder.

The two switches 46 and 47 are provided so as to easily permit detection when the tool 12 has been coupled with or uncoupled from the machine spindle 30. When the tool 12 is being coupled with or received by the spindle 30, the spindle 30 is extended downward to embrace the shank 16 of the tool 12 and the actuating arm 45 is in engagement with the switch 46, as shown in FIG. 2. As the studs 21 travel up the inclined portions 14 of the teeth 13, the spindle 30 is forced upward. The upward movement of the spindle 30 causes the actuating arm 45 to rotate away from the switch 46 and toward the switch 47.

When the tool 12 is to be uncoupled from the machine spindle 30, the spindle 30 is lowered while rotating to bring the studs 21 projecting from the ring member 19 embracing the tool 12 into engagement with the vertical portions 15 of teeth 13. Hence, while the spindle 30 continues to rotate, the tool 12 is prevented from rotating because the studs 21 are in engagement with the vertical portions 15 of the teeth 13. As the spindle 30 continues to rotate while the tool 12 remains stationary, the spindle 30 unthreads from the tool 12. The spindle 30 is forced upward in opposition to the downward feed pressure of the feeding mechanism during the unthreading of the tool 12 from the spindle 30. The upward movement of the spindle 30 causes the actuating arm 45 to rotate away from the switch 46 and toward the switch 47.

Figure 6:
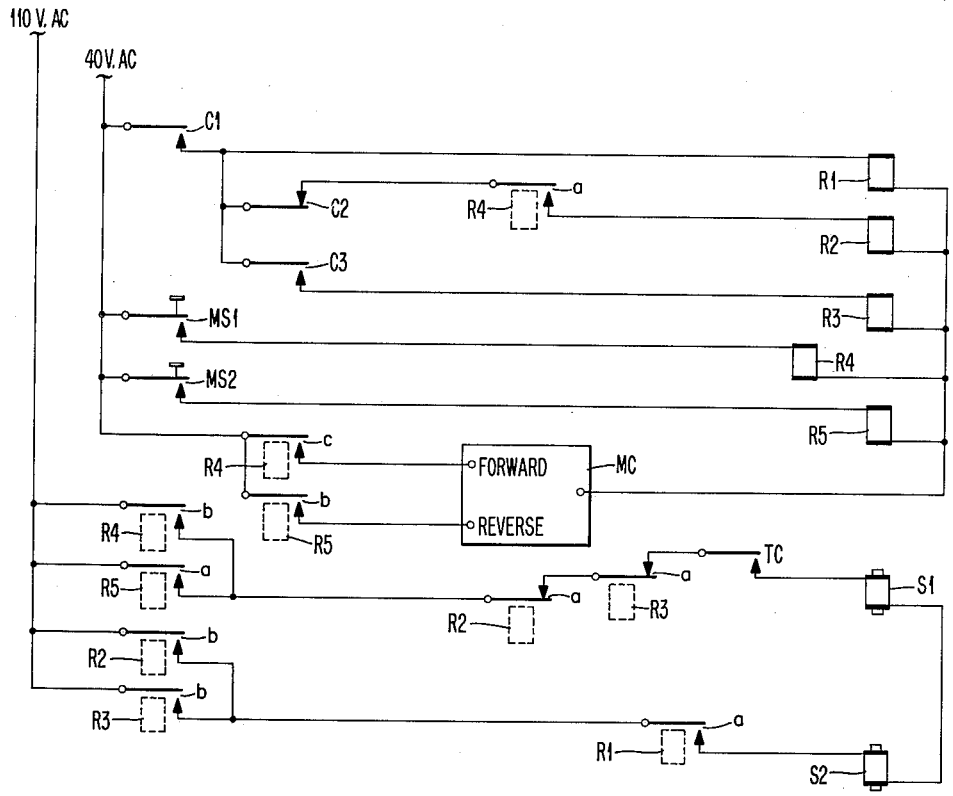
FIG. 6 is a circuit diagram of the control element.
Figure 5:
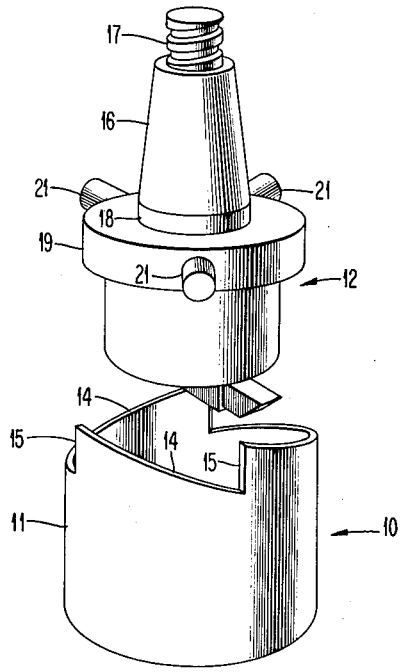
FIG. 5 is a perspective view of the tool and tool cradle.

Since the invention enables tools 12 to be automatically inserted into and removed from the machine spindle 30, the controls for actuating the spindle 30 up and down and for selectively rotating it in clockwise and counterclockwise directions may be automatic, as well as having automatic controls for positioning the machine table 20 relative to the spindle 30. In this example, the coupling of the tools 12 with the spindle 30 is initiated by means of a manually operated switch MS1, while the uncoupling of the tools 12 is initiated by means of a manually operated switch MS2. The manually operated switch MS1 is connected, as shown in FIG. 6, to control the energization of a relay R4. When the switch MS1 is closed, the relay R4 becomes energized and remains energized so long as the switch MS1 is closed. Similarly, the manually operated switch MS2 is connected, as shown in FIG. 6, to control the energization of a relay R5. The relay R5 becomes and remains energized for the period of time that the switch MS2 is closed.

The relays R4 and R5 are adapted to partially control a solenoid S1 which controls the spindle feeding mechanism for moving the spindle 30 downwards towards the machine table 20. Additional control over the solenoid S1 is provided so that the spindle 30 will not be moved downward unless the machine table 20 has been positioned to bring the vertical axis of the tool cradle 10 in alignment with the vertical axis of the machine spindle 30. When the tool cradle 10 on the machine table 20 is properly aligned with the machine spindle 30, a contact TC is closed. The contact TC is connected in series with the solenoid S1 and normally closed contacts R2a and R3a of relays R2 and R3, respectively. The normally closed contact R2a is connected to parallelly connected normally open contacts R4b and R5a of relays R4 and R5, respectively. Hence, when the contact TC is closed and both of the normally closed contacts R2a and R3a are closed, the solenoid S1 will be energized upon either of the relays R4 or R5 becoming energized.

Figure 7:
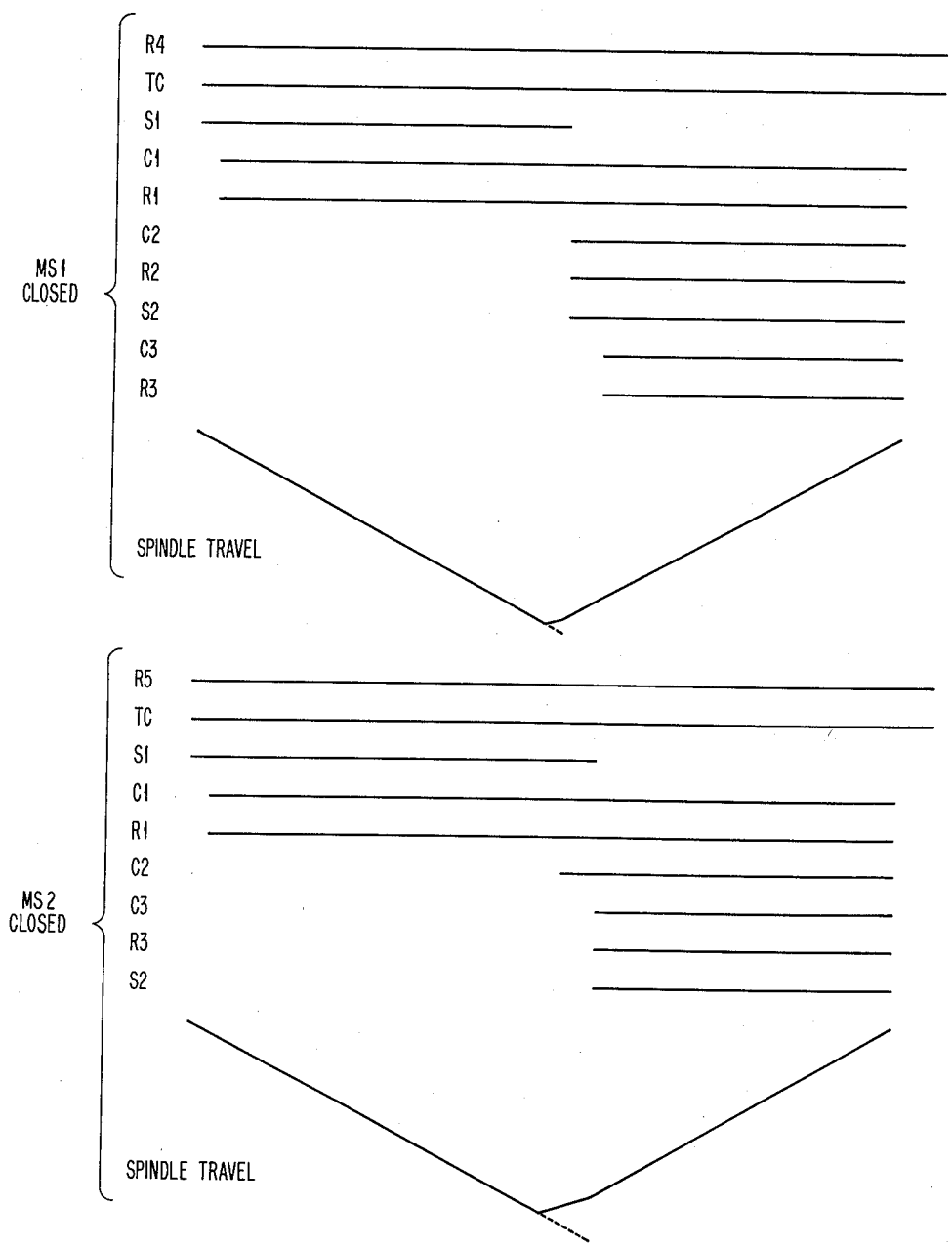
FIG. 7 is a timing diagram for the control elements and spindle movement.

Once the solenoid S1 is energized, it remains energized unless either of the relays R4 or R5 become de-energized, the contacts R2a or R3a open, or the contact TC opens. Since, during a coupling or uncoupling operation, the relays R4 or R5 remain energized for the entire operation, as seen in FIG. 7, and, further, during a coupling or uncoupling operation, the table is not moved and, therefore, the contact TC remains closed, the energization of either relay R2 or R3 will cause the solenoid S1 to become de-energized.

The relay R2 is connected in series with a normally open contact R4a of the relay R4 which is connected in series with a normally closed contact C2 of the switch 46. The contact C2 of the switch 46 is connected in series with a normally open contact C1 of a switch 48 which is fixed to the housing 44 and is adapted to be operated by an arm 49 carried by the upper collar member 35. With the spindle 30 retracted, as shown in FIG. 1, the arm 49 is out of engagement with the contact C1 of the switch 48. As the spindle moves downward under control of the solenoid S1, the arm 49 engages the contact C1 to close the same. The contact C1 remains closed by the arm 49 until the spindle is again retracted to the position shown in FIG. 1.

Figure 3:
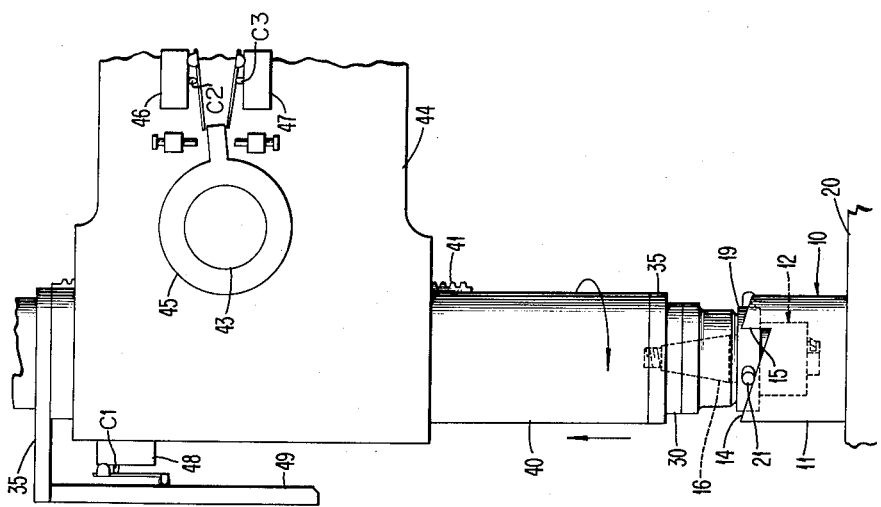
FIG. 3 is a side elevational view showing the spindle still rotating in the clockwise or forward direction and coupled with the tool, the studs projecting from the ring embracing the tool are traveling up the inclined surfaces of the teeth in the tool cradle thereby forcing the spindle upward.

The contact C2 of the switch 46 is a normally closed contact. When the actuating arm 45 operates the switch 46, as shown in FIG. 2, the normally closed contact C2 is opened; however, when the actuating arm 45 is not in engagement with the switch 46, FIGS. 1 and 3, the contact C2 is closed. With the contact C2 closed and the relay R4 energized, the relay R2 becomes energized and remains energized until either the relay R4 becomes de-energized, the contact C2 opens, or the contact C1 opens.

The relay R2 is utilized to control the energization of a solenoid S2. The solenoid S2 controls the spindle feeding mechanism for retracting or feeding the spindle 30 upward. Once the tool 12 has been coupled with or uncoupled from the spindle 30, the same may be retracted or moved upward. Hence, the relay R2 has a normally open contact R2b connected in series with a normally open contact R1a of the relay R1 which is energized when the contact C1 is closed. The normally open contact R1a is connected in series with the solenoid S2. Hence, by this arrangement, when the relay R2 becomes energized upon closing of the contact C1, the contact C2, and the contact R4a, the contact R2a opens and the solenoid S1 becomes de-energized, whereby the downward feeding of the spindle 30 ceases. The contact C1 closes and, as a matter of fact, is already closed by action of the arm 49. The contact C2 closes when the actuating arm 45 disengages from the switch 46. This action takes place as the spindle 30 is forced upward in opposition to the downward feeding of the spindle 30 under control of the solenoid S1. The upward movement of the spindle 30, as shown in FIG. 7, due to the studs 21 climbing the inclined portions 14 of the teeth 13, causes the actuating arm 45 to disengage from the switch 46. While the energization of the relay R2, in effect, causes the downward feeding of the spindle 30 to cease, it continues the upward movement of the spindle 30; this movement already having been started, in opposition to the downward feeding of the spindle, by action of the studs 21 climbing the inclined surfaces 14.

As the spindle 30 continues upward, the actuating arm 45 engages the switch 47 to close a normally open contact C3 which is connected in series with the contact C1 and the relay R3, as shown in FIG. 6. The relay R3 is also utilized to control the energization of the solenoid S2. A normally open contact R3b is connected in series with the normally open contact R1a and in parallel with the normally open contact R2b. Hence, either of the relays R2 or R3 may control the energization of the solenoid S2. Further, since the normally closed contact R3a is in series with the normally closed contact R2a, then, if either relay R2 or R3 is energized, the solenoid S1 becomes de-energized.

During a coupling or uncoupling operation, the switches 46 and 47 are operated; however, during a coupling operation, the switch 46 is the controlling switch while, during an uncoupling operation, the switch 47 is the controlling switch. This may be verified by reference to FIGS. 6 and 7. During a coupling operation, the switch MS1 is closed and the switch MS2 is open. Therefore, the relay R4 is energized and the relay R5 is de-energized. With the relay R4 energized and the contact TC closed, assuming the spindle is in its retracted position shown in FIG. 1, the solenoid S1 will be energized to cause the downward feeding of the spindle 30. As the spindle 30 moves downward, the contact C3 opens, the contact C2 opens, and the contact C1 closes, in the order mentioned. As the contact C1 closes, the relay R1 is energized to close the contact R1a. However, even with the contact R1 closed, the solenoid S2 will not be energized because the contacts R2b and R3b are open. The solenoid S1 remains energized to cause continued downward feeding of the spindle 30. Continued downward feeding of the rotating spindle 30 causes the same to couple with the tool 12 in the tool cradle 10. When the tool 12 couples with spindle 30, the same is forced upward in opposition to the downward feeding of the spindle 30. This upward movement of the spindle 30 causes the actuating arm 45 to first close the contact C2 and then close the contact C3. Since the contact C2 closes first, the contact C1 already having been closed, the relay R2 is energized to cause the energization of the solenoid S2 and thus cause the upward feeding of the spindle 30. Subsequently, the contact C3 is closed by the actuating arm 45 to cause the energization of the relay R3. Although, when the relay R3 is energized, the solenoid S1 becomes de-energized and the solenoid S2 becomes energized, this action already has taken place when the relay R2 was energized; and, therefore, the switch 46 is the controlling switch during the coupling operation.

During an uncoupling operation, the switch MS2 is closed and the switch MS1 is open. With the switch MS2 closed, the relay R5 is energized. When the relay R5 is energized and assuming that the contact TC is already closed, the solenoid S1 will be energized to cause the downward feeding of the spindle 30. As the spindle 30 moves downward, the actuating arm 45 opens the contact C3, opens the contact C2, and the arm 49 closes the contact C1, in the order mentioned. Under these conditions, the solenoid S1 remains energized and the solenoid S2 remains de-energized. As the tool uncouples from the spindle 30, the spindle 30 is forced upward by the unthreading action and the actuating arm 45 first closes the contact C2 and then closes the contact C3. When the contact C2 closes, the relay R2 will not be energized because the contact R4a is open since the relay R4 is not energized. Hence, the solenoid S1 remains energized for a little longer period than it does during a coupling operation. When the tool 12 is completely unthreaded from the spindle 30, the actuating arm 45 closes the contact C3. As the contact C3 closes, the relay R3 becomes energized. With the relay R3 energized, the contact R3a opens and the solenoid S1 becomes de-energized, and the contact R3b closes and the solenoid S2 becomes energized to cause the upward feeding of the spindle 30. Hence, the switch 47 is the controlling switch during the uncoupling operation. The reason for having the switch 47 as the controlling switch during the uncoupling operation is to provide sufficient delay of the energization of the solenoid S2 to insure that the tool 12 is completely unthreaded from the spindle 30 before the spindle 30 is retracted or fed upward.

In order to insure that the spindle is rotating in the proper direction during a coupling and uncoupling operation, normally open contacts R4c and R5b of relays R4 and R5 are connected to a motor control unit MC for controlling the feeding of the spindle 30, as shown in FIG. 6. Since the spindle 30 is to be rotating in a clockwise or forward direction during a coupling operation, the normally open contact R4c is connected to the Forward terminal of the motor control unit MC. Similarly, the spindle 30 is to rotate in a counterclockwise or reverse direction during an uncoupling operation; and, therefore, the normally open contact R5b is connected to the Reverse terminal of the motor control unit MC.

*Machine Operation*

In order to couple one of the tools 12 with the machine spindle 30, the table 20 is positioned, as indicated in the referenced application, supra, to bring the vertical axis of the tool cradle 10 in alignment with the vertical axis of the spindle 30, as shown in FIG. 1. With the table 20 having been properly positioned, the switch MS1 is closed. Upon closing the switch MS1, the relay R4 is energized and thereby energizing the solenoid S1 and causing the spindle 30 to rotate in a clockwise or forward direction. The energizing of the solenoid S1 causes the downward feeding of the rotating spindle so that the contact C3 opens, the contact C2 opens, and the contact C1 closes, in the particular order mentioned. Additionally, the rotating spindle 30 embraces the shank 16 of the tool 12 and, under continued downward feeding, the threads of the spindle thread onto the threads 17 of the tool 12. When sufficient torque is developed between the threads of the spindle 30 and those of the tool 12, the studs 21 are caused to move upward along the inclined surfaces 14 of the teeth 13. This causes the spindle 30 to move upward in opposition to the downward feeding of the spindle by action of the solenoid S1. This upward movement of the spindle is seen in the diagram of FIG. 7. As the spindle moves upward, the actuating arm 45 is caused to disengage from the switch 46 thereby closing the contact C2. With the contact C2 closed, the relay R2 becomes energized, the relay R4 already having been energized to close the contact R4a and the contact C1 having been closed by the arm 49. As the relay R2 becomes energized, the contact R2a opens to de-energize the solenoid S1 and the contact R2b closes to energize the solenoid S2. The energization of the solenoid S2 causes the spindle to retract or be fed upward until the arm 49 permits the contact C1 to open, whereby the relay R1 becomes de-energized and the contact R1a opens to de-energize the solenoid S2. The spindle 30 is now in the position shown in FIG. 1, however, with the tool 12 in the spindle 30.

With the tool 12 having been coupled with the spindle 30, the switch MS1 is opened and the table 20 may be positioned to bring the workpiece in alignment with the spindle 30, which may then be lowered so that the tool 12 may perform an operation on the workpiece.

After the tool 12 performs its operation and it is desired to remove the tool 12 from the spindle 30, the vertical axis of the empty tool cradle 10 is aligned with the vertical axis of the spindle 30. The switch MS2 is then closed to cause the solenoid S1 to become energized by the closing of the contact R5a of relay R5, it being energized with the closing of switch MS2, and the spindle 30 to rotate in the counterclockwise or reverse direction. With the solenoid S1 energized, the spindle 30 lowers, while rotating in the reverse direction, to bring the tool 12 into the tool cradle 10. The contacts C3 and C2 are caused to open and the contact C1 closes, in the order mentioned. The studs 21 engage the vertical portions 15 of the teeth 13, whereby the tool 12 is prevented from further rotation while the spindle 30 continues to rotate. As the spindle 30 continues to rotate, the threads thereof unthread from the threads 17 of the tool 12. This causes the spindle 30 to move upward in opposition to the downward feeding of the spindle 30 by action of the solenoid S1. The upward movement of the spindle 30, as seen in FIG. 7, causes the contact C2 to close; but the relay R2 does not become energized because the contact R4a is open, the relay R4 not having been energized. With the relay R2 de-energized, as well as the relay R3 de-energized, the solenoid S1 remains energized until the actuating arm 45 closes the contact C3. When the contact C3 closes, the relay R3 becomes energized to open the contact R3a and close the contact R3b. With the contact R3a open and the contact R3b closed, the solenoids S1 and S2 become de-energized and energized, respectively. As the solenoid S2 becomes energized, the spindle 30 is retracted until the arm 49 opens the contact C1 of the switch 48, because, when the contact C1 opens, the relay R1 becomes de-energized to open the contact R1a which then causes the solenoids S2 to become de-energized. This completes the uncoupling operation of the tool 12 from the spindle 30. Additional coupling and uncoupling operations would take place in a like manner.

From the foregoing, it is seen that the invention enables the automatic coupling and uncoupling of a tool from a machine spindle. Further, it is seen that the apparatus for normally holding or cradling the tools is utilized to facilitate the automatic coupling and uncoupling of the tools from the machine spindle. Additionally, it is seen that the cradling mechanism is simple in construction, easy to manufacture, and does not have any relative moving parts. Also, it is seen that, during a coupling or uncoupling operation, the spindle is caused to move upward in opposition to the downward feeding of the spindle, and this upward movement of the spindle is utilized to actuate mechanism for signaling the machine that the tool has been coupled with or uncoupled from the machine spindle.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A device for cradling machine tools to enable the automatic coupling and uncoupling of the tools from a machine spindle comprising in combination ring elements embracing said tools, stud elements projecting radially outward from said ring elements, tool cradles selectively positionable to be in alignment with the longitudinal axis of said spindle having slots for engaging said stud elements, said slots being formed to cooperate with said stud elements to permit coupling of the tools with said machine spindle, said machine spindle being acted upon to develop a coupling torque, and means operable in response to said tool becoming coupled with said spindle for detecting changes in the coupling torque between said tool and spindle in order to signal that the tool is coupled with the spindle.

2. A device for cradling machine tools to enable the automatic coupling and uncoupling of the tools from a machine spindle comprising in combination ring elements embracing said tools, stud elements projecting radially outward from said ring elements, tool cradles selectively positionable to be in alignment with the longitudinal axis of said spindle having slots for engaging said stud elements to develop an uncoupling torque to uncouple said tools from said machine spindle, and means operable in response to said tool becoming uncoupled from said spindle for detecting changes in the uncoupling torque between said tool and spindle to signal that the tool is uncoupled from the spindle.

3. In apparatus of the type described the combination comprising a table selectively positionable to discrete coordinate positions, a plurality of tool cradle elements fixed to said table at discrete coordinate positions, a plurality of machine tools residing in said plurality of tool cradle elements, a machine spindle adapted to embracingly receive said machine tools residing in said tool cradles brought into alignment therewith, ring elements embracing said tools, and stud elements fixed to project radially outward from said ring elements and adapted to engage said cradle elements to support the machine tools so as to enable coupling and uncoupling torques to develop between said tools brought into alignment with and embraced by said machine spindle.

4. In an apparatus of the type described the combination comprising a spindle for receiving machine tools positioned at a predetermined coordinate position, said spindle being adapted to be rotated and translated simultaneously; a table having discrete coordinate positions selectively movable to bring selected coordinate positions into alignment with said spindle; a plurality of tool cradle elements fixed to said table at certain of said discrete coordinate positions to cradle a plurality of machine tools, said tool cradle elements being provided with a series of tooth elements; means for bringing said machine spindle into coupling engagement with one of said tools residing in one of said tool cradle elements; a plurality of ring elements embracing said machine tools; and stud elements projecting radially outward from said ring elements and adapted to engage said tooth elements of said tool cradles to enable a coupling torque to develop between said tools and spindle as the same engages the tools.

5. In an apparatus of the type described the combination comprising a spindle for receiving machine tools positioned at a predetermined coordinate position, said spindle being adapted to be rotated and translated simultaneously; a table having discrete coordinate positions selectively movable to bring selected coordinate positions into alignment with said spindle; a plurality of tool cradle elements fixed to said table at certain of said discrete coordinate positions to cradle a plurality of machine tools, said tool cradle elements being provided with a series of tooth elements; a plurality of ring elements embracing said machine tools, stud elements projecting radially outward from said ring elements and adapted to engage said tooth elements of said tool cradles to enable a coupling torque to develop between said tools and spindle as the same engages the tools; feeding means for bringing said spindle into coupling engagement with said tools while the same are residing with said tool cradle elements, said spindle being movable in opposition to the action of said feeding while being coupled with said tools; and means operable in response to movement of said spindle in opposition to the action of said feeding means to generate a signal for indicating that the coupling action is completed.

6. In an apparatus according to claim 5 further comprising means operable in response to movement of said spindle in opposition to the action of said feeding means to generate a signal for indicating that an uncoupling action is completed.

7. Apparatus of the type described comprising a spindle for receiving machine tools, said spindle being adapted to be rotated and translated simultaneously; a plurality of tool cradle elements selectively positionable to be in alignment with the longitudinal axis of said spindle, each of said tool cradle elements being provided with a series of tooth elements; a machine tool provided with a shank and adapted to be supported by each of said tool cradle elements; and stud elements projecting radially outward from said shank and adapted to engage said tooth elements of said tool cradles to support said tool relative to said cradles and to enable a coupling torque to develop between said tool and spindle as the same engages the tool while said stud elements engage the tooth elements of said tool cradles.

8. Apparatus of the type described comprising a spindle for receiving machine tools, said spindle being adapted to be rotated and translated simultaneously; a hollow cylindrical body positionable to be in alignment with the longitudinal axis of said spindle, said body being provided with at least one notch formed in one end thereof, said notch having at least one sloping side and one vertical side; a tool to be coupled with said spindle; a stud element fixed to project from said tool; and means for supporting said tool within said cylindrical body so that said stud element is resting within said notch whereby, when said spindle rotating in one direction embraces said tool, said stud cooperates with said sloping side to develop a coupling torque between said spindle and tool and, when said spindle rotating in another direction embraces said tool, said stud cooperates with said vertical side to develop an uncoupling torque between said spindle and tool.

References Cited in the file of this patent

UNITED STATES PATENTS

| | | |
|---|---|---|
| 2,367,672 | Di Cosmo | Jan. 23, 1945 |
| 2,901,927 | Morgan | Sept. 1, 1959 |

FOREIGN PATENTS

| | | |
|---|---|---|
| 16,727 | Great Britain | 1910 |
| 758,135 | Great Britain | Sept. 26, 1956 |